Sept. 2, 1969                D. KAHNG               3,464,762
OPTICAL WAVE MODULATOR
Filed Dec. 16, 1965
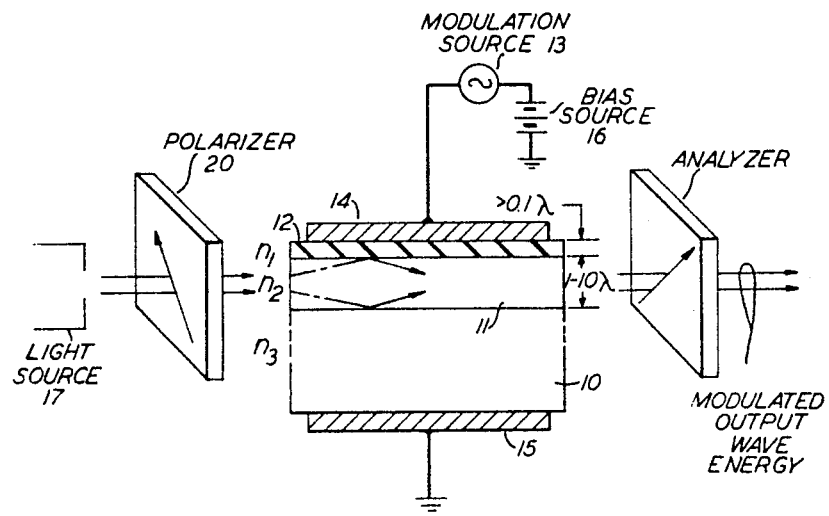
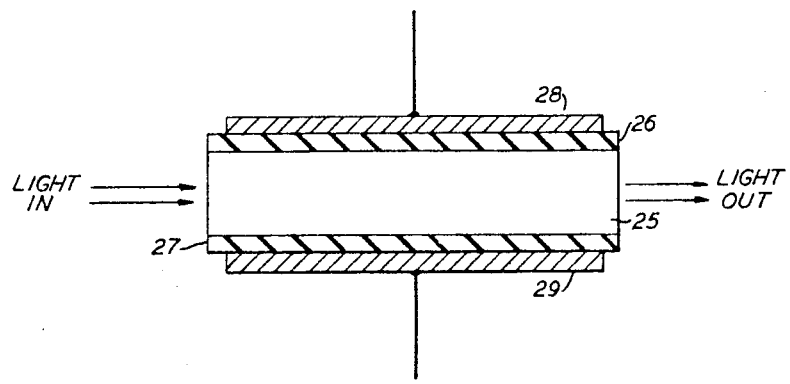
INVENTOR
*D. KAHNG*
BY
*Sylvan Sherman*
ATTORNEY United States Patent Office 3,464,762
Patented Sept. 2, 1969

3,464,762
OPTICAL WAVE MODULATOR
Dawon Kahng, Somerville, N.J., assignor to Bell Telephone Laboratories, Incorporated, New York, N.Y., a corporation of New York
Filed Dec. 16, 1965, Ser. No. 514,340
Int. Cl. G02f 1/26
U.S. Cl. 350—150                    6 Claims

ABSTRACT OF THE DISCLOSURE

A semiconductor optical modulator in which an optical wave path of electro-optical material is bounded by thin layers of low-loss insulating material. This eliminates the metal electrodes from the immediate vicinity of the optical wave energy and, thereby reduces the losses in the modulator. It also results in a substantial reduction in the amplitude of the modulating electrical field required to produce a significant degree of modulation.

---

This invention relates to apparatus for modulating electromagnetic wave energy in the optical frequency range.

The use of electro-optic materials to modify the parameters of an electromagnetic wave is well known in the art. See, for example, the article entitled "Electro-Optic Properties of Some $ABO_3$ Perovskites in the paraelectric Phase," by J. E. Geusic, S. K. Kurtz, L. G. Van Uitert and S. H. Wemple, published in the Apr. 15, 1964 issue of Applied Physics Letters. Also see the copending application by R. T. Denton, J. E. Geusic and L. G. Van Uitert, Ser. No. 353,049, filed Mar. 19, 1964, and assigned to applicant's assignee.

The operation of the devices described in the above-cited publication and patent application depends upon the fact that an impressed electric field causes a significant variation in the refractive index of the electro-optic material. As a result of this variation in refractive index, the direction of polarization and wavelength of an electromagnetic wave can be modified or, more simply, the phase of the wave can be controlled. As a consequence, such devices can serve many system functions as, for example, amplification discrimination and modulation.

Whatever the function to be fulfilled, an electro-optic device typically comprises an element of electro-optic material disposed between a pair of metallic electrodes. At optical frequencies a beam of light is directed upon the material, frequently in a direction parallel to the electrodes, while a variable electric field is impressed between the electrodes.

One method of minimizing the amplitude of the terminal voltage required to produce a significant degree of modulation, is to operate the modulator near its Curie point. This, however, places severe limitations upon the modulator material. For example, the modulator must be made of a carefully tailored material (such as KTN), and the composition of the material must be very uniform throughout. In addition, temperature fluctuation must be kept very small.

One other method of minimizing the modulating voltage is to reduce the thickness of the material between the electrodes. However, when this is done, the optical wave energy "sees" the metallic electrodes which are in contact with the electro-optic material, resulting in an increased loss of optical wave energy.

It is the object of the present invention to reduce the amplitude of the modulating voltage required for use with electro-optic modulators without significantly increasing the losses in such modulators.

In accordance with the present invention, the metallic electrodes normally associated with electro-optic devices are removed from the immediate vicinity of the optical wave path by bounding the wave path with layers of non-metallic dielectric material. By selecting the bounding materials to have refractive indices that are less than the refractive index of the electro-optic material, the optical wave energy is totally reflected at the boundaries of the wave path and is, thereby, confined within the optical wave path.

Since the metallic electrodes used to apply the modulating field are no longer in contact with the electro-optic material, the thickness of the electro-optic layer can be made substatnially thinner than was possible heretofore, thereby reducing the amplitude of the modulating voltage that need be applied to the device. In addition, the thin insulating layer prevents the flow of any significant amount of modulation current, resulting in a highly efficient modulator.

In a first embodiment of the invention, one side of the electro-optic material is bounded by a layer of highly conductive semiconductor material, and the other side is bounded by a thin layer of insulating material.

In a second embodiment of the invention, the electro-optic material is bounded on both sides by thin layers of insulating material. The metallic electrodes, used to impress an electric field across the modulator, are placed in contact with the bounding materials in both embodiments.

These and other objects and advantages, the nature of the present invention, and its various features, will appear more fully upon consideration of the various illustrative embodiments now to be described in detail in connection with the accompanying drawings, in which:

FIG. 1 shows a first illustrative embodiment of an optical wave modulator in accordance with the invetnion in which the electro-optic material is bounded by an insulating material and a highly conductive dielectric material; and FIG. 2 shows an alternate embodiment of the invention in which the electro-optic material is bounded by two insulating materials.

Referring to the drawing, FIG. 1 shows a modulator in accordance with the invention comprising a substrate 10 of highly conductive semiconductor material upon which there is deopsited a thin layer 11 of less conductive electro-optic material. Layer 11 can be a different material than the substrate, or it can be the same material that is differently doped. For example, layer 11 can be realized by compensating some of the donors (acceptors) in the substrate 10 with suitable acceptors (donors) by a diffusion process, or by other suitable means. This forms a thin layer of higher resistivity along one surface of the substrate. While there are a large variety of materials described in the literature that can be used for this purpose, the present invention is of particular utility in connection with those electro-optic materials that cannot presently be made into p-n junctions. Included in this category are the materials of the optassium tantalate-niobate system described in the above-cited application by Denton et al. For purposes of illustration, the substrate 10 in the embodiment of FIG. 1 is made of potassium tantalate (herein referred to as KT) that has been suitably doped with a material such as calcium, for example, to a donor concentration of the order of $10^{19}$ donors per cubic centimeter or higher.

The layer 11 which constitutes the optical path of the modulator, is approximately 1–10 wavelengths thick and is made of KT having a donor concentration of the order of $10^{17}$ donors per cubic centimeter or less.

The upper surface of the light path is bounded by a thin layer 12 of insulating material such as alumina or silicon dioxide. This layer is made as thin as possible, but no thinner than about one-tenth the wavelength of the light to be modulated.

The modulating signal, derived from a modulating source 13, is impressed across the light path by means of a pair of metallic electrodes 14 and 15 which are in ohmic contact with the insulating layer 12 and the substrate 10, respectively. Also illustrated is a bias source 16 which impresses a constant electric field across the modulator.

The variety of ways in which a modulator of the type described can be employed to modulate a light beam are well known. Without regard to the details of any particular mode of operation, light, derived from a suitable light source 17, is directed onto the edge of semiconductor layer 11 through a polarizer 20 and propagates therealong in a direction essentially parallel to the upper and lower surfaces of said layer. It is recognized, however, that the light beam will tend to diverge and make contact at a shallow angle with the upper and lower bounding surfaces of the light path. In accordance with the invention, the light waves that come in contact with the path boundaries are totally reflected at these boundaries by selecting the materials of the modulator such that the index of refraction $n_2$ of the light path layer 11 is larger than the indices of refraction $n_1$ and $n_3$ of the insulating layer 12 and the substrate 10, respectively.

As noted previously, prior art bulk modulators require large modulating voltages. Efforts to reduce the amplitude of the modulating voltage, by decreasing the distance between electrodes, have tended to increase the optical losses in the modulator as the optical wave energy comes in contact with the electrodes. In accordance with the present invention the electrodes are no longer in contact with the electro-optic material and, hence, the latter can be made as thin as desired. By making the substrate 10 of highly conductive material, the bias voltage and the modulating voltage are divided primarily between the electro-optic material 10 and the insulating layer 12. It is for this reason that the latter is advantageously made as thin as possible while still retaining its ability to totally reflect the optical wave energy incident upon it from within the electro-optic material.

FIG. 2 is an alternate embodiment of the invention in which the substrate 10 of highly conductive material, utilized in the embodiment of FIG. 1, is replaced by a thin layer of insulating material. Thus, the modulator of FIG. 2 comprises a layer of electro-optic material 25, whose thickness is of the order of 1–10 wavelengths of the light to be modulated, bounded by two insulating layers 26 and 27. As in the embodiment of FIG. 1, the insulating layers 26 and 27 have indices of refraction that are less than the index of refraction of the electro-optic material 25. The modulating field and biasing field are applied across the electro-optic material by means of electrodes 28 and 29 that are located on opposite sides of the modulator and are in contact with insulating layers 26 and 27, respectively. To minimize the amplitude of the modulating voltage, the insulating layers are made as thin as possible but, typically, greater than one-tenth of a wavelength of the light to be modulated.

It is understood that the above-described optical modulators are illustrative of only two possible specific embodiments which can represent applications of the principles of the invention. Numerous and varied other arrangements can readily be devised in accordance with these principles by those skilled in the art without departing from the spirit and scope of the invention.

What is claimed is:
1. An optical modulator comprising:
a thin layer of electro-optic material having a thickness of between one and ten wavelengths of the optical wave energy to be propagated therethrough;
said material being bounded on opposite sides by layers of dielectric materials whose indices of refraction are less than the index of refraction of said electro-optic material;
and means comprising a pair of electrodes in contact with said layers of dielectric material for impressing a variable electric field across said modulator;
characterized in that said optical wave energy is projected onto and extracted from opopsite ends of said electro-optic material along a direction parallel to said opopsite sides.

2. The modulator according to claim 1 wherein said dielectric materials are insulators having a thickness of the order of a wavelength or less.

3. The modulator according to claim 1 wherein one of said dielectric materials is an insulator having a thickness of the order of a wavelength or less; and wherein the other of said dielectric materials is a highly conductive semiconductive material.

4. The modulator according to claim 1 wherein said electro-optic material is a semiconductor material having a significant impurity concentration of about $10^{17}$ atoms per cubic centimeter or less.

5. The modulator according to claim 1 wherein said electro-optic material is potassium tantalate.

6. The modulator according to claim 1 including a source of optical wave energy; and means for directing said wave energy onto said electro-optic material in a direction substantially parallel to said sides.

References Cited

UNITED STATES PATENTS

| | | | |
|---|---|---|---|
| 1,879,138 | 9/1932 | Eccles et al. | 350—150 |
| 3,094,436 | 6/1963 | Schroder | 350—150 |
| 3,290,619 | 12/1966 | Geusic et al. | 350—150 |
| 3,311,845 | 3/1967 | Koester | 350—150 |
| 3,102,201 | 8/1963 | Braunstein et al. | 350—160 X |
| 3,208,342 | 9/1965 | Nethercot | 350—160 X |

FOREIGN PATENTS 584,593  1/1955  Canada.

DAVID SCHONBERG, Primary Examiner

P. R. GILLIAM, Assistant Examiner

U.S. Cl. X.R.

350—160